W. S. SHERMAN.
CUT-OFF SAW ATTACHMENT FOR END MATCHERS.
APPLICATION FILED APR. 17, 1916.
1,224,675.
Patented May 1, 1917.
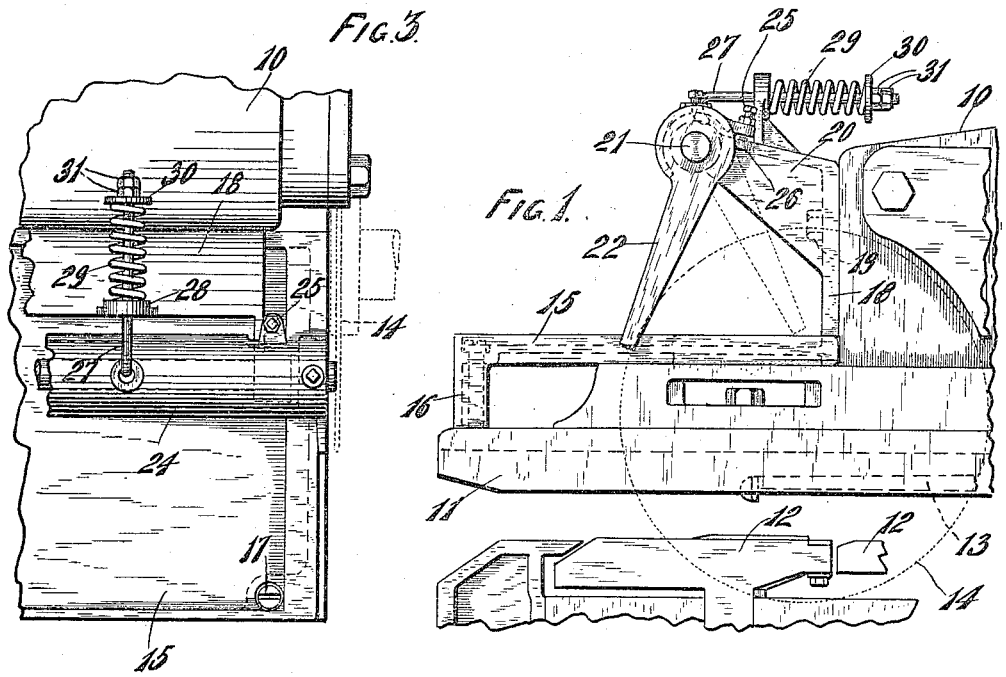
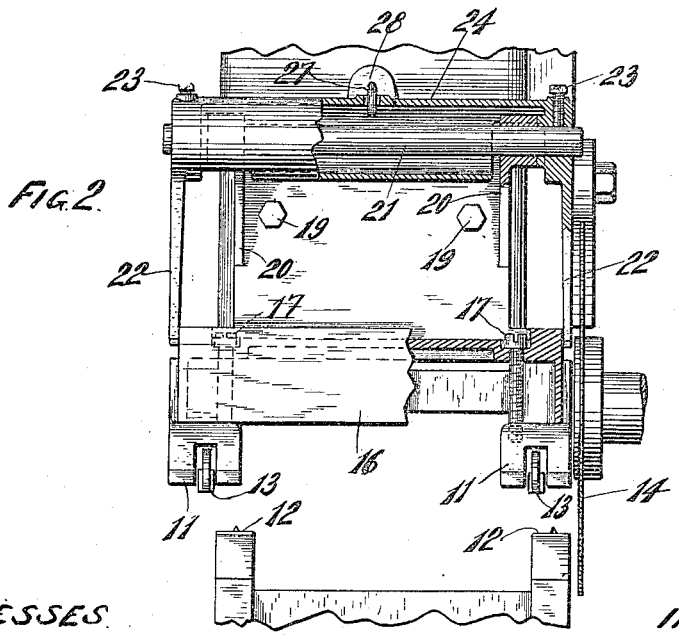
WITNESSES
INVENTOR.
Willis S. Sherman,
By R. S. Caldwell.
ATTORNEY.

UNITED STATES PATENT OFFICE.

WILLIS S. SHERMAN, OF MILWAUKEE, WISCONSIN.

CUT-OFF-SAW ATTACHMENT FOR END-MATCHERS.

1,224,675.

Specification of Letters Patent.

Patented May 1, 1917.

Application filed April 17, 1916. Serial No. 91,524.

*To all whom it may concern:*

Be it known that I, WILLIS S. SHERMAN, a citizen of the United States, and resident of Milwaukee, in the county of Milwaukee and State of Wisconsin, have invented new and useful Improvements in Cut-Off-Saw Attachments for End-Matchers, of which the following is a description, reference being had to the accompanying drawings, which are a part of this specification.

This invention has for its object to provide an attachment for an end matcher of the type in which the work is mechanically fed, first to a cut-off saw and then to one or more matching saws, such attachment providing access to the cut-off saw independently of the work feeding means whereby the strip of lumber may have the end cut off therefrom without being subjected to the end matching operation.

Another object of the invention is to provide such a cut-off saw attachment with means which will guard the saw and will serve as a guide for maintaining the work at a predetermined angle with relation to the saw while it is being fed thereto.

With the above and other objects in view the invention consists in the cut-off saw attachment for end matchers as herein claimed and all equivalents.

Referring to the accompanying drawing, in which like characters of reference indicate the same parts in the different views, Figure 1 is an end view of a portion of an end matcher provided with the cut-off saw attachment of this invention, the cut-off saw being shown in dotted lines;

Fig. 2 is a front view thereof with parts sectioned; and,

Fig. 3 is a plan view of a portion thereof.

In these drawings 10 indicates a stationary head block with grooved guide runners 11 secured thereto, the horizontal slot between said guide runners and spring pressed presser heads 12 therebeneath forming a work feeding passageway through which strips of lumber such as flooring and the like may be mechanically fed by reciprocating hook bars 13, first past a cut-off saw 14 and then past one or more matching saws, not shown. The end matcher with which the cut-off saw attachment of this invention is shown is substantially like that covered in my application Serial No. 879,029, filed December 26, 1914, though the invention is adapted for use with any end matcher provided with a cut-off saw affording a suitable location for the attachment. The attachment constituting this invention consists of a bed plate 15 having a downwardly extending front flange 16 bearing on the stationary grooved guide runners 11 and secured thereto by means of screws 17 countersunk below the smooth top bearing surface formed at the edges of the bed plate for the work to slide upon. At its rear the bed plate 15 has an upwardly extending back plate 18 secured by bolts 19 to the head block 10, and bracket arms 20 projecting forwardly from the back plate form bearings at their ends through which is loosely mounted a rod or shaft 21. Parallel downwardly extending guide arms 22 are fixed on the ends of the shaft 21 by set screws 23 and just clear the ends of the bed plate 15 in their arc of movement, as indicated by the full line position and the dotted line position in Fig. 1. The two guide arms 22 are preferably formed on the ends of a tubular shell 24 which is provided with suitable openings through which the bracket arms 20 pass so that the swinging movements of the guide arms 22 will be permitted, and the forward movement of the guide arms is limited by an adjustable stop 25 preferably consisting of a set screw threaded through a lug which projects from the tubular shell 24, said set screw being provided with a set nut for holding it in its adjustments and being adapted to engage a stop lug 26 projecting from one of the bracket arms 20. The guide arms 22 are held in this forward position with spring pressure, though permitted to yield when work is pressed thereagainst. A hook 27 is engaged through an opening in the tubular shell 24 and slidably passes through an upwardly extending ear 28 on the edge of the back plate 18, and a coil spring 29 surrounding the hook stem bears at one end against the ear 28 and at the other end against a washer forming a spring seat 30 which is held in place on the hook by a pair of nuts 31.

In operation strips are regularly fed through the throatway of the machine to the work feeding passageway between the stationary guide runners 11 and the spring pressed presser bars 12 through which it is mechanically fed by the reciprocating hook bars 13 past the cut-off saw 14, and then past the matching saw or saws, but occasionally the operator will discover a strip which is not suitable for end matching, and then instead of feeding it to the throatway of the machine he places it on the bed plate 15 and presses it against the guide arms 22 which, by yielding together, permit the strip to engage the cut-off saw and become severed thereby. The work resting on the table formed by the bed plate 15 and bearing against the spring pressed guide arms 22 which recede in unison is guided against changing its angular position with relation to the saw after the saw has entered therein, and the danger of bending and breaking the saw is thus avoided. The defective strip of lumber may thus be cut into convenient lengths for handling as waste without passing through the end matcher, and avoiding the mixing of such waste strips with the end matched flooring which would later have to be sorted.

What I claim as new and desire to secure by Letters Patent is:

1. In an end matcher having a work feeding passageway, a cut-off saw, and means for feeding work through the work feeding passageway past the cut-off saw, a supplemental work supporting table at the side of the cut-off saw upon which work may be severed without being fed through the work feeding passageway.

2. An attachment for end matchers and the like having a cut-off saw, comprising a bed plate positioned at the side of the cut-off saw and forming a work supporting table and yieldingly resisting swinging guide arms mounted above the bed plate to guide the work as it is pushed against the cut-off saw.

3. An attachment for end matchers and the like having a cut-off saw, comprising a bed plate positioned at the side of the cut-off saw and forming a work supporting table, bracket arms connected to the bed plate, parallel guide arms pivotally mounted in the bracket arms and connected together to move in unison and swinging past the sides of the bed plate, and means for holding the guide arms in a forward position.

4. An attachment for end matchers and the like having a cut-off saw comprising a bed plate positioned at the side of the cut-off saw and forming a work supporting table, a back plate extending upwardly from the bed plate, bracket arms projecting forwardly from the back plate, a shaft rotatably mounted in the bracket arms, guide arms fixed on the shaft outside of the bracket arms, a tubular shell connecting the guide arms and having openings to receive the bracket arms, an adjustable stop on the tubular shell for engaging one of the bracket arms to limit the movements of the guide arms, a hook member engaged with the tubular shell, an ear on the back plate through which the hook member passes, and a spring surrounding the hook member and bearing against the ear and against a spring seat on the hook member for holding the guide arms in a forward position with spring pressure.

5. In an end matcher having a pressure head with a surface forming a wall of a work feeding passageway, a cut-off saw, means for feeding work through the work feeding passageway past the cut-off saw, and a supplemental work supporting table formed on the opposite face of the presser head upon which work may be severed by the cut-off saw without being fed through the work feeding passageway.

In testimony whereof, I affix my signature, in presence of two witnesses.

WILLIS S. SHERMAN.

Witnesses:
R. S. C. CALDWELL,
KATHERINE HOLT.

Copies of this patent may be obtained for five cents each, by addressing the "Commissioner of Patents, Washington, D. C."